United States Patent
Takagi

(10) Patent No.: US 10,052,970 B2
(45) Date of Patent: Aug. 21, 2018

(54) POWER CONVERTING APPARATUS FOR VEHICLES

(71) Applicant: KABUSHIKI KAISHA TOSHIBA, Minato-ku, Tokyo (JP)

(72) Inventor: Takashi Takagi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 23 days.

(21) Appl. No.: 15/422,027

(22) Filed: Feb. 1, 2017

(65) Prior Publication Data
US 2017/0144567 A1    May 25, 2017

Related U.S. Application Data

(63) Continuation of application No. PCT/JP2014/070751, filed on Aug. 6, 2014.

(51) Int. Cl.
*H02P 5/74* (2006.01)
*B60L 15/08* (2006.01)
*B60L 11/18* (2006.01)
*H02P 27/08* (2006.01)

(52) U.S. Cl.
CPC ............ *B60L 15/08* (2013.01); *B60L 11/1803* (2013.01); *H02P 5/74* (2013.01); *H02P 27/085* (2013.01); *B60L 2210/44* (2013.01)

(58) Field of Classification Search
CPC ........................................................ H02P 5/74
USPC ..................................................... 318/51, 34
See application file for complete search history.

(56) References Cited

U.S. PATENT DOCUMENTS 5,376,868 A * 12/1994 Toyoda .................. B60L 15/20
318/52

FOREIGN PATENT DOCUMENTS

| JP | 06165307 A | 6/1994 |
|---|---|---|
| JP | 3247539 B2 | 1/2002 |
| JP | 2002051566 A | 2/2002 |
| JP | 2005160185 A | 6/2005 |

(Continued)

OTHER PUBLICATIONS

International Search Report (ISR) and Written Opinion dated Oct. 21, 2014 issued in International Application No. PCT/JP2014/070751.

*Primary Examiner* — David S Luo
(74) *Attorney, Agent, or Firm* — Holtz, Holtz & Volek PC

(57) ABSTRACT

A power converting apparatus for vehicles according to an embodiment controls a plurality of AC motors for vehicle traveling set on a motor setting table. The power converting apparatus includes a plurality of inverter circuits and a plurality of controllers. The plurality of inverter circuits supply three-phase AC power to the AC motors. The plurality of controllers generate control signals for ON/OFF-controlling a plurality of switching elements of the inverter circuits and perform PWM control on the inverter circuits associated with the plurality of controllers among the plurality of inverter circuits. The plurality of controllers perform the PWM control on the associated inverter circuits according to control signals generated using carrier waves having phases different from one another. A phase difference between the carrier waves is based on the number of the plurality of AC motors set on the motor setting table.

10 Claims, 5 Drawing Sheets

(56) References Cited

FOREIGN PATENT DOCUMENTS

| | | | |
|---|---|---|---|
| JP | 2009268265 | A | 11/2009 |
| JP | 2012222847 | A | 11/2012 |

\* cited by examiner

POWER CONVERTING APPARATUS FOR VEHICLES

CROSS-REFERENCE TO RELATED APPLICATIONS

This application is a Continuation of International Application No. PCT/JP2014/070751 filed on Aug. 6, 2014, the entire contents of which are incorporated herein by reference.

TECHNICAL FIELD

Embodiments of the present invention relate to a power converting apparatus for vehicles.

BACKGROUND ART

In recent years, concerning a driving scheme for vehicles such as a railroad vehicle, according to the development of a power electronics technique, a scheme for controlling an AC motor using an inverter that converts DC power into AC power is the mainstream.

However, when inverter control is performed, there is a problem in that electromagnetic noise occurs. This is caused by performing PWM (Pulse Width Modulation) control on an inverter when the DC power is converted into the AC power. In the PWM control, a pulse voltage used for ON/OFF control of a switching element of the inverter is a rectangular wave. A steep voltage change occurs at a rising edge and a falling edge of the rectangular wave.

Because of the steep voltage change, harmonics are always superimposed on an output current of the inverter with respect to a fundamental wave. The fundamental wave refers to an AC component of a frequency desired to be output to the AC motor. When an alternating current obtained by combining the fundamental wave and the harmonics is energized to the AC motor, physical vibration due to a frequency component of an electric current occurs in a stator and a rotor of the AC motor. Electromagnetic noise (direct noise) depending on a vibration frequency of the physical vibration occurs.

As the electromagnetic noise that occurs in the AC motor, besides the direct noise, there is also solid propagation noise that occurs because the vibration of the AC motor is propagated through a motor setting table such as a truck, to which the AC motor is attached, and a vehicle main body.

CITATION LIST

Patent Literature

Patent Literature 1: Japanese Patent No. 3247539

SUMMARY OF INVENTION

Technical Problem

A problem that the present invention is to solve is to provide a power converting apparatus for vehicles capable of suppressing electromagnetic noise and improving quietness in the interior and the exterior of a vehicle.

Solution to Problem

A power converting apparatus for vehicles according to an embodiment is a power converting apparatus for vehicles that controls a plurality of AC motors for vehicle traveling set on a motor setting table. The power converting apparatus for vehicles includes: a plurality of inverter circuits; and a plurality of controllers. The plurality of inverter circuits are configured to convert DC power into three-phase AC power according to ON/OFF operation of the plurality of switching elements, the plurality of inverter circuits supplying the three-phase AC power to the AC motors associated with the plurality of inverter circuits among the plurality of AC motors. The plurality of controllers generate, on the basis of a comparison result of a signal wave and a carrier wave, control signals for ON/OFF-controlling the plurality of switching elements of the inverter circuits and perform PWM control on the inverter circuits associated with the plurality of controllers among the plurality of inverter circuits according to the control signals. The plurality of controllers perform the PWM control on the associated inverter circuits according to control signals generated using carrier waves having phases different from one another. A phase difference between the carrier waves is based on the number of the plurality of AC motors set on the motor setting table.

DESCRIPTION OF EMBODIMENTS

Power converting apparatuses for vehicles of embodiments according to the present invention are explained below with reference to the drawings.

First Embodiment

Figure 1:
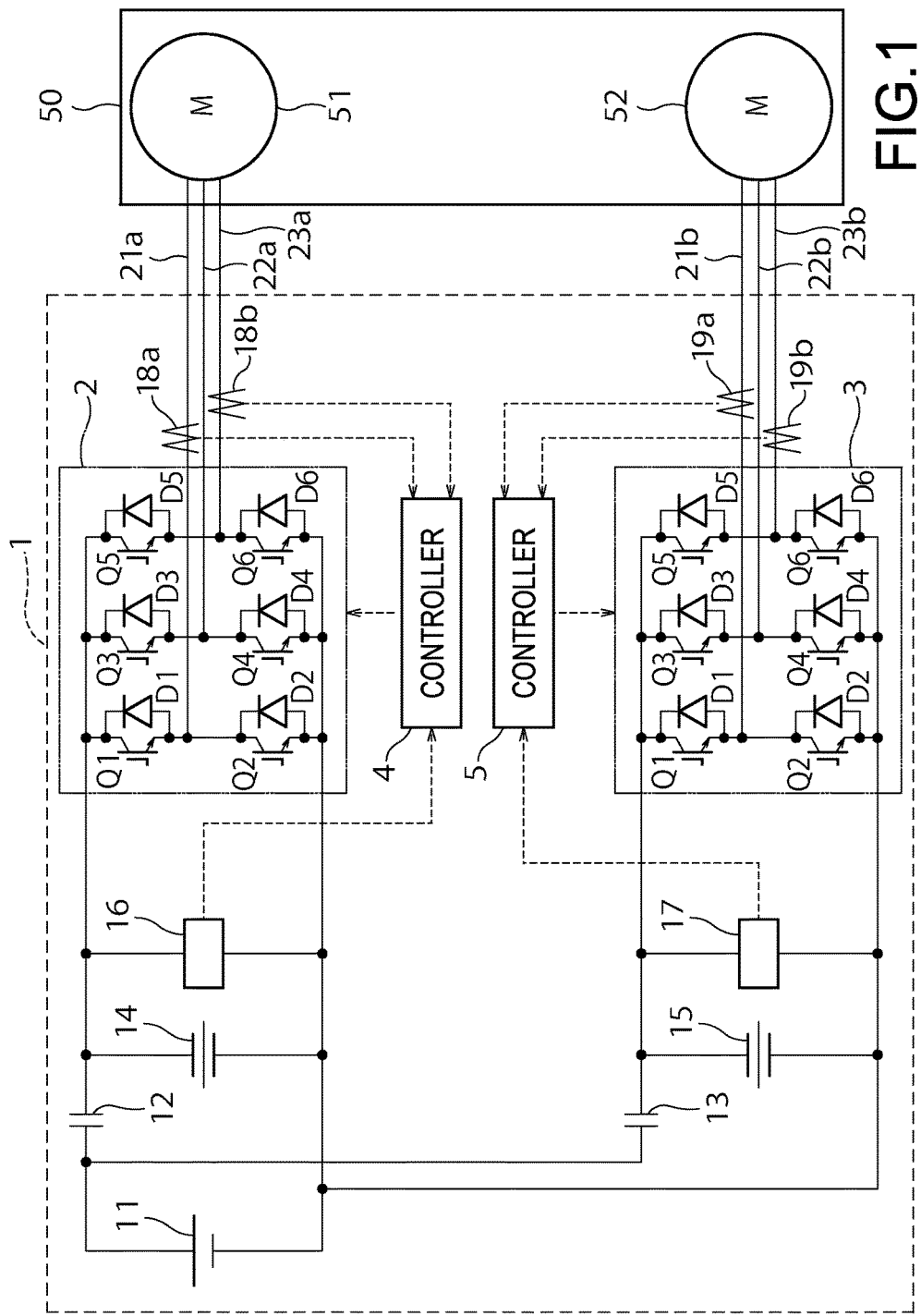
FIG. 1 is a diagram showing a schematic configuration of a power converting apparatus for vehicles 1 according to a first embodiment of the present invention.

A power converting apparatus for vehicles according to a first embodiment is explained with reference to FIG. 1. FIG. 1 shows a schematic configuration of a power converting apparatus for vehicles 1 according to the first embodiment.

The power converting apparatus for vehicles 1 controls AC motors 51 and 52 for vehicle traveling set on the same motor setting table 50. The motor setting table 50 is a truck of a railroad vehicle but may be trucks of other vehicles. The AC motors 51 and 52 are, for example, three-phase AC motors such as permanent magnet synchronous motors (PMSMs). Note that, in the case of the railroad vehicle, the power converting apparatus for vehicles 1 is usually provided in a railroad vehicle main body rather than the truck.

The power converting apparatus for vehicles 1 includes, as shown in FIG. 1, inverter circuits 2 and 3 connected to the AC motors 51 and 52, controllers 4 and 5 that output control signals (gate signals) to the inverter circuits 2 and 3, a DC power supply 11 that supplies DC power to the inverter circuits 2 and 3, contactors 12 and 13 for inputting and releasing the DC power to and from the inverter circuits 2 and 3, smoothing capacitors 14 and 15, DC voltage detectors 16 and 17, and alternating current detectors 18a, 18b, 19a, and 19b. The components are explained in detail below.

The inverter circuits 2 and 3 include, as shown in FIG. 1, switching elements Q1 to Q6 and diodes D1 to D6 connected in parallel to the switching elements. The inverter circuits 2 and 3 are configured to convert, according to ON/OFF operation of the switching elements Q1 to Q6, the DC power input from the DC power supply 11 into three-phase AC power having a predetermined frequency and a predetermined voltage. The three-phase AC power converted by the inverter circuit 2 is supplied to the AC motor 51 via AC supply lines 21a, 22a, and 23a. Similarly, the three-phase AC power converted by the inverter circuit 3 is supplied to the AC motor 52 via AC supply lines 21b, 22b, and 23b.

Note that the switching elements Q1 to Q6 are semiconductor switching elements and are, for example, insulated gate bipolar transistors (IGBTs). However, the switching elements Q1 to Q6 are not limited to this and may be bipolar transistors, MOSFETs, or the like. The configuration of the inverter circuits is not limited to the configuration shown in FIG. 1 and may be another configuration as long as the configuration is a configuration for converting DC power into AC power.

As shown in FIG. 1, the inverter circuits 2 and 3 supply the three-phase AC power to, of the plurality of AC motors 51 and 52, the AC motors associated with the inverter circuits 2 and 3. That is, the inverter circuit 2 supplies the three-phase AC power to the AC motor 51 and the inverter circuit 3 supplies the three-phase AC power to the AC motor 52.

A voltage value of AC voltage input to the inverter circuit 2 is input to the controller 4 from a DC voltage detector 16. A current value of an alternating current output from the inverter circuit 2 is input to the controller 4 from alternating current detectors 18a and 18b. Similarly, a voltage value of a DC voltage input to the inverter circuit 3 is input to the controller 5 from a DC voltage detector 17. A current value of an alternating current output from the inverter circuit 3 is input to the controller 5 from alternating current detectors 19a and 19b. Note that, for example, the controllers 4 and 5 may be configured by one processor or may be configured by separate processors.

The controllers 4 and 5 generate control signals for ON/OFF-controlling the switching elements Q1 to Q6 of the inverter circuits 2 and 3 and perform, according to the control signals, PWM control on the inverter circuits associated with the controllers 4 and 5. That is, the controller 4 performs the PWM control on the inverter circuit 2. The controller 5 performs the PWM control on the inverter circuit 3.

More specifically, the controllers 4 and 5 perform the PWM control on the inverter circuits 2 and 3 according to control signals generated using carrier waves (carriers) having phases different from each other. A phase difference between the carrier waves is explained in detail below.

Concerning a method of generating the control signals, more specifically, the controllers 4 and 5 generate the control signals on the basis of a result of comparison of signal waves and carrier waves. The signal waves are generated on the basis of input DC voltage values of the inverter circuits (values measured by the DC voltage detectors 16 and 17) and output alternating currents of the inverter circuits (values measured by the alternating current detectors 18a, 18b, 19a, and 19b). As the carrier waves, for example, triangular waves having a predetermined frequency are used. However, waveforms of another shape such as saw-tooth waves may be used. Note that the carrier waves having different phases are generated by, for example, dividing a carrier wave output from one oscillator into two carrier waves and adjusting a phase(s) of one or both of the carrier waves with phase adjusting means such as a phase shift circuit or a delay circuit in which an operational amplifier is used.

The contactor 12 electrically connects or disconnects the DC power supply 11 and the inverter circuit 2. Similarly, the contactor 13 electrically connects or disconnects the DC power supply 11 and the inverter circuit 3. The inverter circuits 2 and 3 can be respectively opened and closed by the contactors 12 and 13. Consequently, for example, when the inverter circuit 2 breaks down, it is possible to continue motor control by the inverter circuit 3 by electrically disconnecting the DC power supply 11 and the inverter circuit 2 using the contactor 12.

The smoothing capacitors 14 and 15 are capacitors for smoothing a voltage output from the DC power supply 11. For example, filter capacitors are used.

The DC voltage detector 16 measures a DC voltage input to the inverter circuit 2. A measured voltage value is output to the controller 4. Similarly, the DC voltage detector 17 measures a DC voltage input to the inverter circuit 3. A measured voltage value is input to the controller 5.

The alternating current detector 18a is provided in the AC supply line 21a and measures an alternating current flowing to a U phase of the AC motor 51. The alternating current detector 18b is provided in the AC supply line 23a and measures an alternating current flowing to a W phase of the AC motor 51. Similarly, the alternating current detector 19a is provided in the AC supply line 21b and measures an alternating current flowing to a U phase of the AC motor 52. The alternating current detector 19b is provided in the AC supply line 23b and measures an alternating current flowing to a W phase of the AC motor 52. Note that the measurement of the alternating current may be performed concerning any two phases among the U phase, the V phase, and the W phase or may be performed concerning all of the three phases by adding alternating current detectors.

Figure 2:
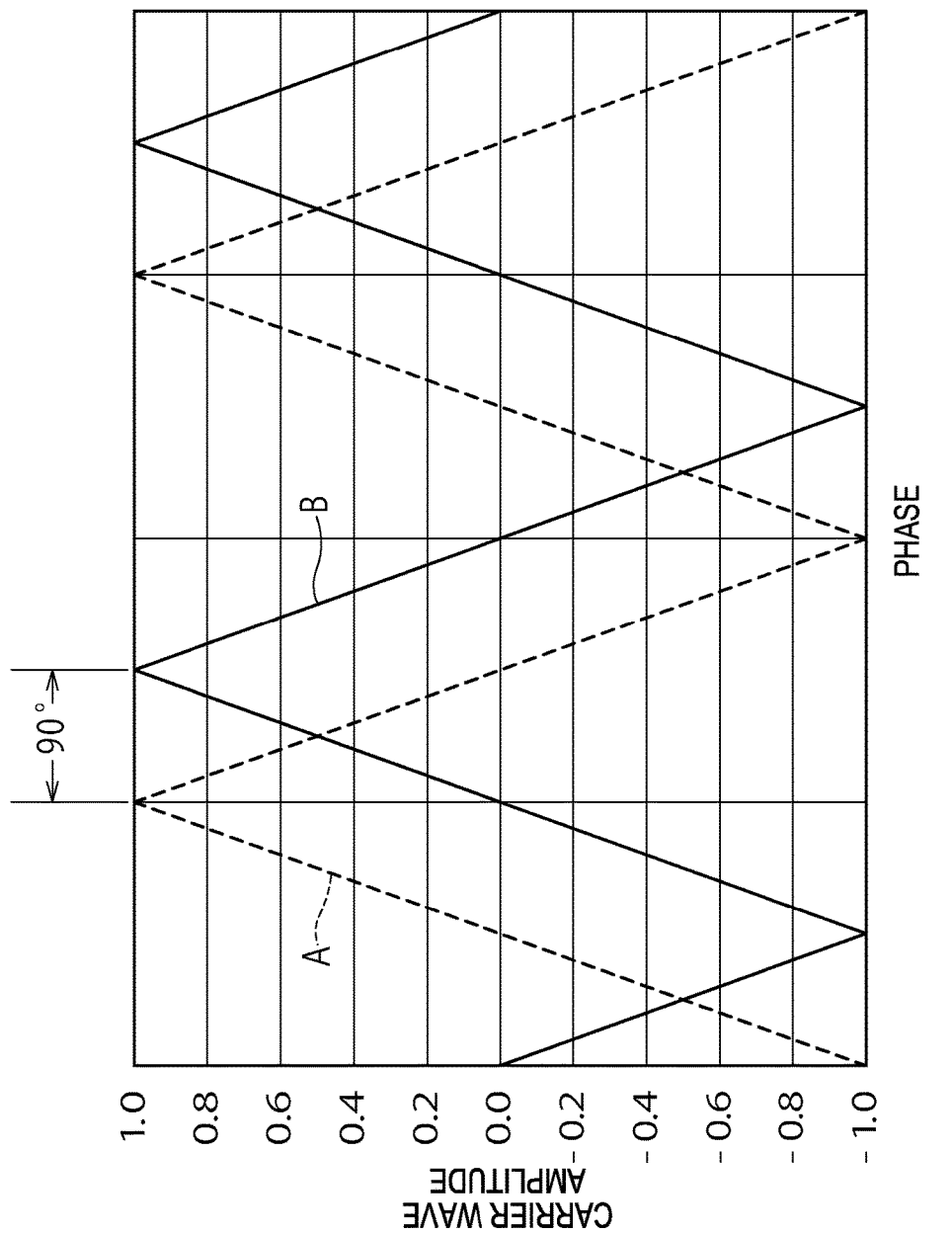
FIG. 2 is a diagram showing waveforms of carrier waves A and B used for generating control signals of inverter circuits 2 and 3.

Waveforms of the carrier waves used by the controllers 4 and 5 to generate control signals are explained with reference to FIG. 2. FIG. 2 shows waveforms of carrier waves A and B used for generating control signals for the inverter circuits 2 and 3. The carrier wave A is used to generate the control signal for the inverter circuit 2. The carrier wave B is used to generate the control signal for the inverter circuit 3.

As shown in FIG. 2, a phase difference between the carrier wave A and the carrier wave B is 90°. The phase difference is based on the number of AC motors set on the motor setting table 50. Note that, in order to increase a reduction effect of electromagnetic noise, frequencies of the carrier wave A and the carrier wave B are desirably substantially the same.

The phase difference between the carrier waves in this embodiment is more specifically explained. It is assumed that the number of AC motors set on the motor setting table 50 is N (N is an integer equal to or larger than 2). Since the inverter circuits are provided for the AC motors, N inverter circuits are provided in the power converting apparatus for vehicles 1. When a predetermined inverter circuit among the N inverter circuits is set as a reference and a phase of a carrier wave used to generate a control signal output to the inverter circuit is set to 0°, phases of carrier waves used to generate control signals output to the other (N−1) inverter circuits are respectively within a predetermined angle range centering on $(180/N)°$, $\{2\times(180/N)\}°$, $\{3\times(180/N)\}°$, ..., and $\{(N-1)\times(180/N)\}°$.

For example, when two AC motors are set on the motor setting table 50, phases of carrier waves used to generate control signals for inverter circuits are values within the predetermined angle range centering on 0° and 90°. When four AC motors are set on the motor setting table 50, phases of carrier waves used to generate control signals for inverter circuits are values within the predetermined angle range centering on 0°, 45°, 90°, and 135°.

The predetermined angle range is, for example, a range not overlapping adjacent carrier waves, that is, $\pm(90/N)°$.

Incidentally, a pulsating current occurs because of an inter-phase voltage. Electromagnetic noise is caused by the occurrence of the pulsating current. That is, the inter-phase voltage is a main cause of electromagnetic noise of a vehicle. Therefore, it is effective to analyze the inter-phase voltage in order to evaluate the electromagnetic noise. A result of performing a frequency analysis of the inter-phase voltage is explained with reference to FIG. 3.

Figure 3:
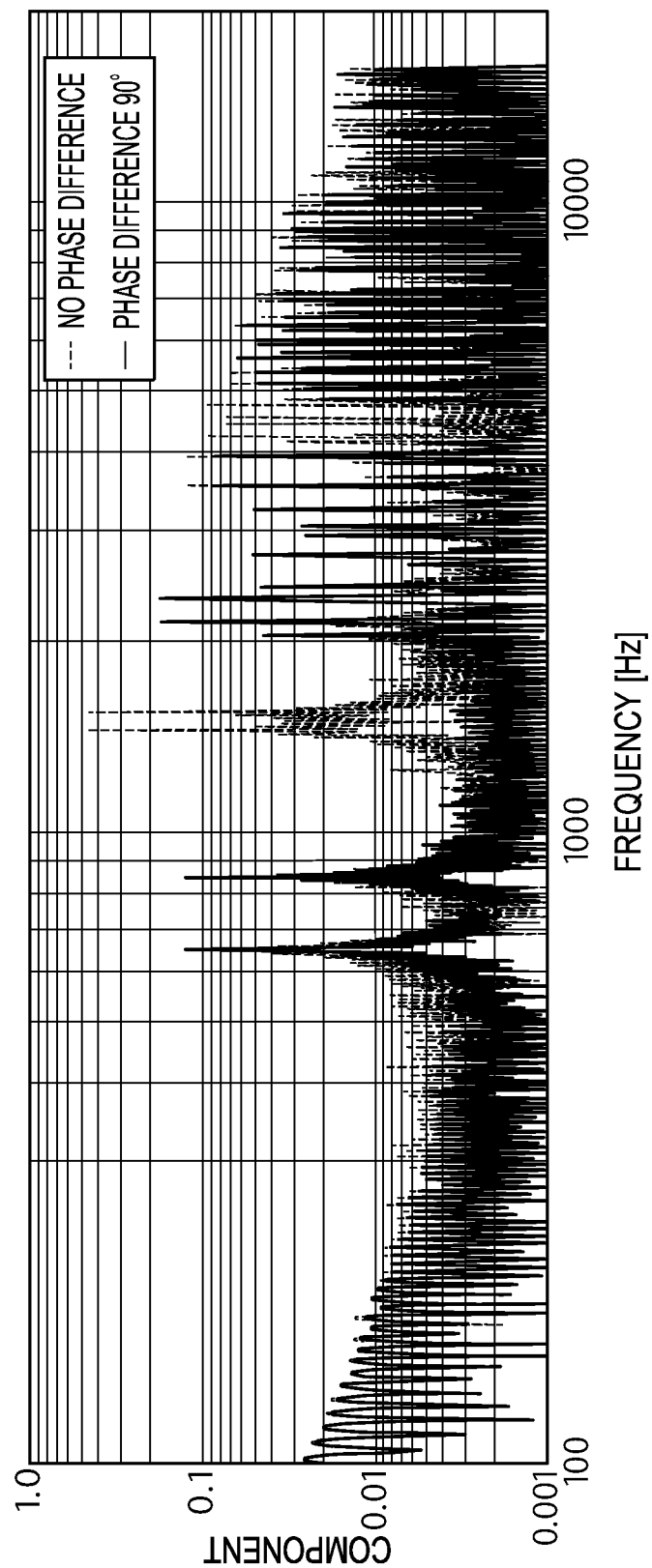
FIG. 3 is a diagram showing a simulation result obtained by performing a frequency analysis of a sum of inter-phase voltages.

FIG. 3 shows a simulation result of a frequency analysis (FFT) of a sum of inter-phase voltages between the U phase and the V phase. More specifically, FIG. 3 shows a result obtained by performing a frequency analysis of a voltage of a sum of an inter-phase voltage between the U phase and the V phase supplied from the inverter circuit 2 to the AC motor 51 and an inter-phase voltage between the U phase and the V phase supplied from the inverter circuit 3 to the AC motor 52.

In FIG. 3, a broken line indicates a spectrum of an inter-phase voltage in the case in which a phase difference between two carrier waves is 0°. A solid line indicates a spectrum of an inter-phase voltage in the case in which the phase difference is 90°. Note that frequencies of both of the carrier waves are 750 Hz. Spectrum components are shown concerning an audible region (100 Hz to 20 kHz) excluding a fundamental wave. It is assumed that three-phase AC power output from the inverter circuits 2 and 3 is symmetrical three phases of the same phase.

As shown in FIG. 3, when the phase difference is 0°, a spectrum component having a highest peak value appears at 1.5 kHz. On the other hand, when the phase difference is 90°, the peak at 1.5 kHz disappears. In addition, when the phase difference is 90°, a peak near the 4.5 kHz also disappears. Whereas a value obtained by integrating spectrum components concerning the audible region of 100 Hz to 20 kHz is 2.11 in the case of the phase difference of 0°, the value is 0.99 in the case of the phase difference of 90°. It is seen that the integrated value decreases a half or more when the phase difference of 90° is provided. A reason for this is as explained below.

That is, when the phase difference between the carrier waves is provided, timing for ON/OFF-controlling the switching elements Q1 to Q6 shifts between the inverter circuit 2 and the inverter circuit 3. As a result, high-frequency components generated by the inverter circuits cancel one another. Consequently, the harmonics peak of the voltage of the sum of the inter-phase voltages disappears. The integrated value of the spectrum components greatly decreases.

Figure 4:
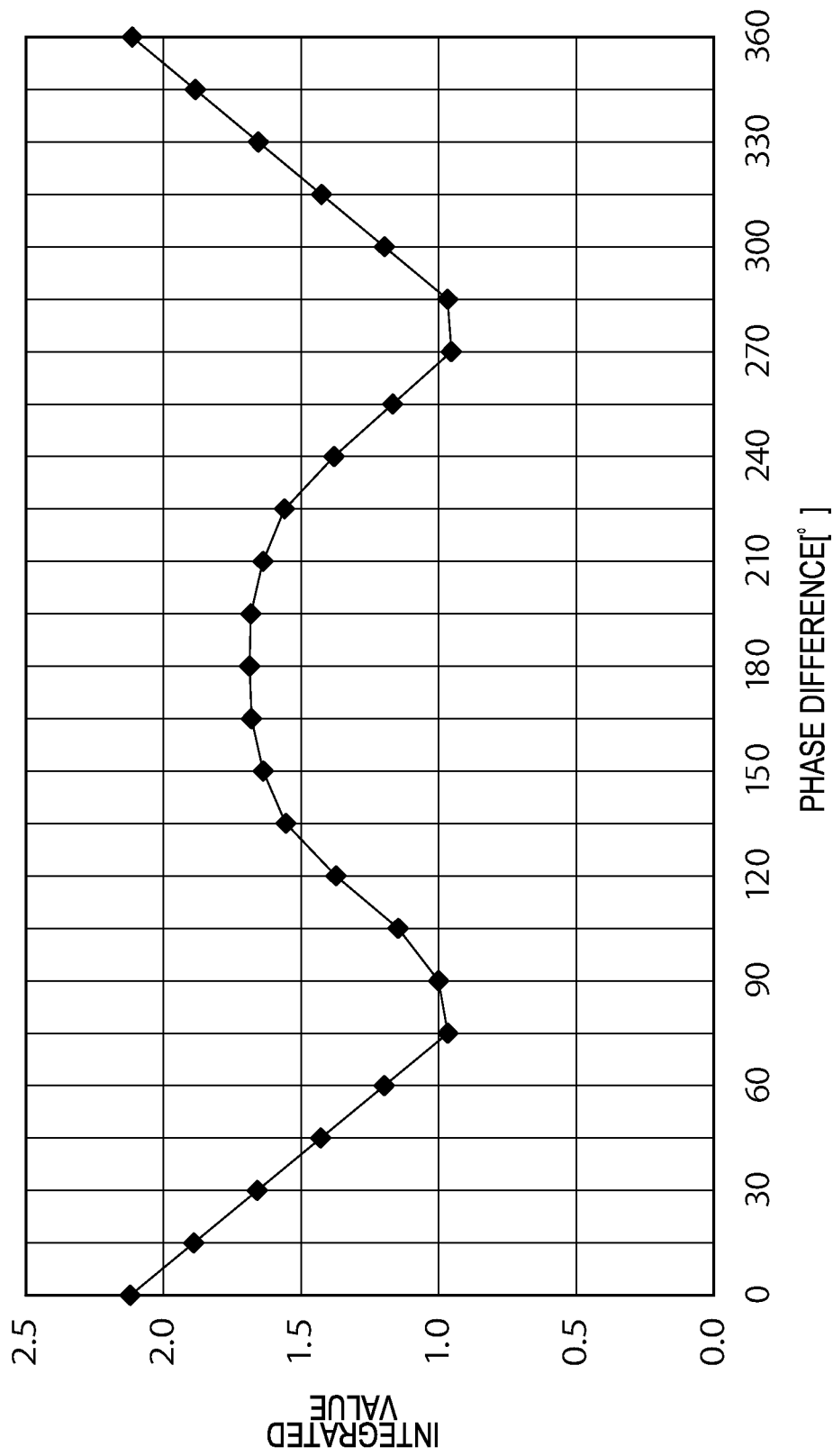
FIG. 4 is a graph showing a relation between a phase difference between two carrier waves and an integrated value of a spectrum component obtained by the frequency analysis.

A relation between a phase difference and an integrated value obtained by performing the frequency analysis while changing a phase difference between carrier waves is explained. FIG. 4 is a graph showing a relation between a phase difference between two carrier waves and an integrated value of a spectrum component in the case of N=2. As shown in FIG. 4, when a phase of another carrier wave is set to 90° or 270° (i.e., −90°) with respect to a phase (0°) of one carrier wave, the integrated value is substantially the smallest. In FIG. 4, the integrated value is the smallest at a phase difference (approximately 75°) smaller than 90°. This is affected by, for example, a power factor that is not an ideal value (1) but is approximately 0.85.

Note that, as it is seen from FIG. 4, the phases of the carrier waves are desirably in an angle range of ±30° and more desirably in an angle range of ±15° centering on 90° (or 270°).

As explained above, in the first embodiment, when a plurality of AC motors 51 and 52 are set on the same motor setting table 50, control signals generated on the basis of carrier waves having phases different from each other are used when the plurality of AC motors 51 and 52 are PWM-controlled in the inverter circuits 2 and 3 to which the plurality of AC motors 51 and 52 are respectively allocated. Consequently, harmonics components generated in the inverter circuits 2 and 3 cancel each other. As a result, although vibration of the AC motors 51 and 52 set on the motor setting table 50 does not change, it is possible to reduce solid propagation noise that occurs because the vibration is propagated through the motor setting table 50 and the vehicle main body.

Therefore, according to the first embodiment, it is possible to suppress electromagnetic noise and improve quietness in the interior and the exterior of a vehicle such as a railroad vehicle.

Second Embodiment

A second embodiment of the present invention is explained. One of differences between the second embodiment and the first embodiment is that, whereas the controllers are separately provided for the inverter circuits in the first embodiment, only one common controller that controls inverters is provided in the second embodiment. The second embodiment is explained below centering on the differences from the first embodiment.

Figure 5:
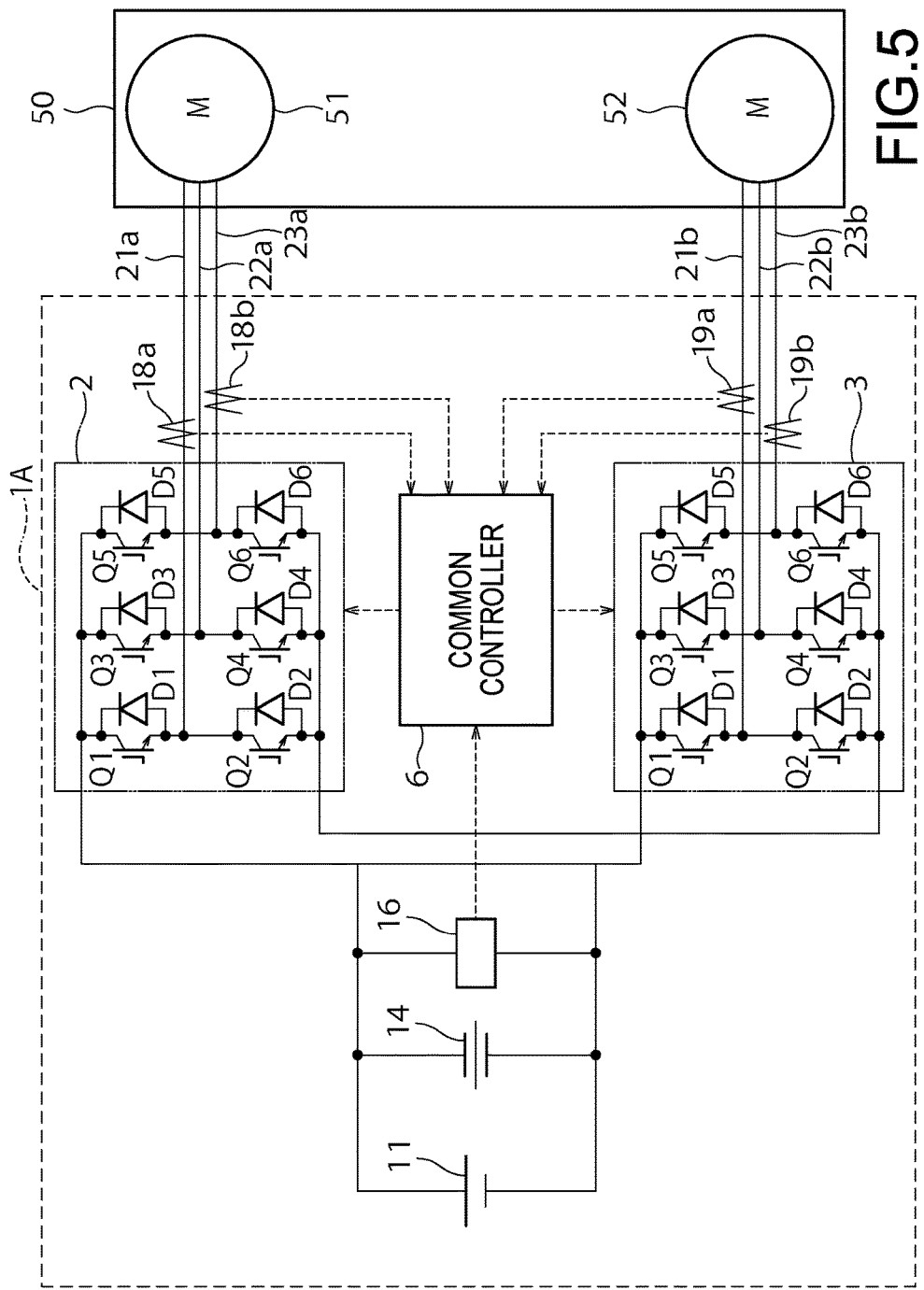
FIG. 5 is a diagram showing a schematic configuration of a power converting apparatus for vehicles 1A according to a second embodiment of the present invention.

FIG. 5 shows a schematic configuration of a power converting apparatus for vehicles 1A according to a second embodiment. In FIG. 5, components having functions same as the functions in the first embodiment are denoted by reference numerals and signs same as the reference numerals and signs in FIG. 1.

The power converting apparatus for vehicles 1A includes, as shown in FIG. 5, the inverter circuits 2 and 3, a common controller 6 that outputs control signals to the inverter circuits 2 and 3, the DC power supply 11 that supplies DC power to the inverter circuits 2 and 3, the smoothing capacitor 14, the DC voltage detector 16, and the alternating current detectors 18a, 18b, 19a, and 19b.

The DC voltage detector 16 measures DC voltages input to the inverter circuits 2 and 3. Voltage values measured by the DC voltage detector 16 are output to the common controller 6.

The DC voltages input to the inverter circuits 2 and 3 are input to the common controller 6 from the DC voltage detector 16. Alternating currents output from the inverter circuits 2 and 3 are input to the common controller 6 from the alternating current detectors 18a, 18b, 19a, and 19b.

The common controller 6 generates, concerning each of a plurality of inverter circuits, on the basis of a comparison result of a signal wave and a carrier wave, control signals for ON/OFF-controlling a plurality of switching elements Q1 to Q6 of the inverter circuits. The common controller 6 performs PWM control on the plurality of inverter circuits according to the generated control signals.

In this way, the common controller 6 generates control signals concerning each of the inverter circuits 2 and 3 and performs the PWM control on the inverter circuits 2 and 3 according to the generated control signals.

The common controller 6 performs the PWM control on the plurality of inverter circuits according to control signals generated using carrier waves having phases different from each other. A phase difference between the carrier waves is a value based on the number of AC motors set on the motor setting table 50 as in the first embodiment. That is, in the case of N=2, the phase difference is 90° and is more generally $(180/N)°$. Besides, characteristics concerning the phase difference between the carrier waves are the same as the characteristics in the first embodiment. Therefore, detailed explanation of the characteristics is not repeated.

In the second embodiment, as in the first embodiment, when the plurality of AC motors 51 and 52 are PWM-controlled by the inverter circuits 2 and 3, control signals generated on the basis of carrier waves having different phases are used. Consequently, harmonics components generated in the inverter circuits 2 and 3 cancel each other. As a result, it is possible to reduce solid propagation noise that occurs because the vibration of the AC motors 51 and 52 set on the motor setting table 50 is propagated through the motor setting table 50 and the vehicle main body.

Therefore, according to the second embodiment, it is possible to improve quietness in the interior and the exterior of a vehicle such as a railroad vehicle.

The several embodiments of the present invention are explained above. However, these embodiments are presented as examples and are not intended to limit the scope of the invention. These embodiments can be implemented in other various forms. Various omissions, replacements, and changes can be made in a range not departing from the spirit of the invention. These embodiments and modifications of the embodiments are included in the scope and the gist of the invention and included in the inventions described in claims and a scope of equivalents of the inventions.

REFERENCE SIGNS LIST 1, 1A power converting apparatus for vehicles
2, 3 inverter circuit
4, 5 controller
6 common controller
11 DC power supply
12, 13 contactor
14, 15 smoothing capacitor
16, 17 DC voltage detector
18a, 18b, 19a, 19b alternating current detector
21a, 21b, 22a, 22b, 23a, 23b AC supply line
50 motor setting table
51, 52 AC motor
A, B carrier wave
Q1 to Q6 switching element
D1 to D6 diode

The invention claimed is:

1. A power converting apparatus for vehicles that controls a plurality of AC motors for vehicle traveling set on a motor setting table, the power converting apparatus for vehicles comprising:
a plurality of inverter circuits configured to convert DC power into three-phase AC power according to ON/OFF operation of the plurality of switching elements, the plurality of inverter circuits supplying the three-phase AC power to the AC motors associated with the plurality of inverter circuits among the plurality of AC motors; and
a plurality of controllers configured to generate, on the basis of a comparison result of a signal wave and a carrier wave, control signals for ON/OFF-controlling the plurality of switching elements of the inverter circuits and perform, according to the control signals, PWM control on the inverter circuits associated with the plurality of controllers among the plurality of inverter circuits, wherein
the plurality of controllers perform the PWM control on the associated inverter circuits according to control signals generated using carrier waves having phases different from one another, and
a phase difference between the carrier waves is based on a number of the plurality of AC motors set on the motor setting table.

2. The power converting apparatus for vehicles of claim 1, wherein, when a number of the plurality of AC motors is N (N is an integer equal to or larger than 2) and when a phase of a carrier wave used to generate a control signal output to a predetermined inverter circuit among the plurality of inverter circuits is set to 0°, phases of carrier waves used to generate control signals output to the other (N−1) inverter circuits are respectively within a predetermined angle range centering on $(180/N)°$, $\{2\times(180/N)\}°$, $\{3\times(180/N)\}°$, ..., and $\{(N-1)\times(180/N)\}°$.

3. The power converting apparatus for vehicles of claim 2, wherein the angle range is $\pm(90/N)°$.

4. The power converting apparatus for vehicles of claim 2, wherein
the number of the plurality of AC motors is two, and
the angle range is ±30°.

5. The power converting apparatus for vehicles of claim 1, wherein the plurality of AC motors are set on a same motor setting table.

6. A power converting apparatus for vehicles that controls a plurality of AC motors for vehicle traveling set on a motor setting table, the power converting apparatus for vehicles comprising:
a plurality of inverter circuits configured to convert DC power into three-phase AC power according to ON/OFF operation of the plurality of switching elements, the plurality of inverter circuits supplying the three-phase AC power to the AC motors associated with the plurality of inverter circuits among the plurality of AC motors; and
a common controller configured to generate, concerning each of the plurality of inverter circuits, on the basis of a comparison result of a signal wave and a carrier wave, control signals for ON/OFF-controlling the plurality of switching elements of the inverter circuit and perform PWM control on the plurality of inverter circuits according to the control signals, wherein
the common controller performs the PWM control on the plurality of inverter circuits according to control signals generated using carrier waves having phases different from one another, and
a phase difference between the carrier waves is based on a number of the plurality of AC motors set on the motor setting table.

7. The power converting apparatus for vehicles of claim 6, wherein, when a number of the plurality of AC motors is N (N is an integer equal to or larger than 2) and when a phase of a carrier wave used to generate a control signal output to a predetermined inverter circuit among the plurality of inverter circuits is set to 0°, phases of carrier waves used to generate control signals output to the other (N−1) inverter circuits are respectively within a predetermined angle range centering on (180/N)°, {2×(180/N)}°, {3×(180/N)}°, . . . , and {(N−1)×(180/N)}°.

8. The power converting apparatus for vehicles of claim 7, wherein the angle range is ±(90/N)°.

9. The power converting apparatus for vehicles of claim 7, wherein
the number of the plurality of AC motors is two, and
the angle range is ±30°.

10. The power converting apparatus for vehicles of claim 6, wherein the plurality of AC motors are set on a same motor setting table.

* * * * *